Patented Oct. 27, 1925.

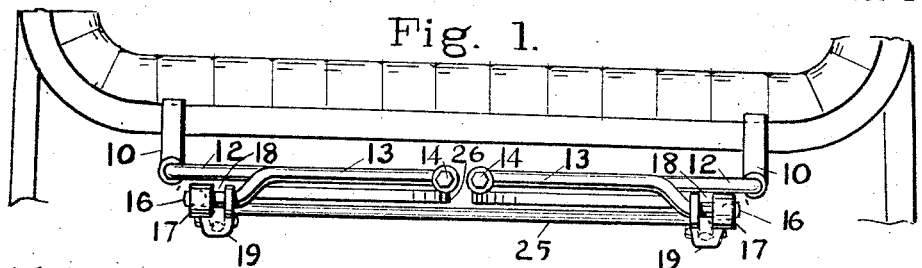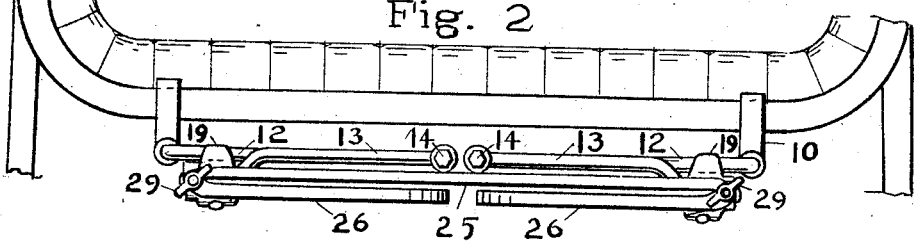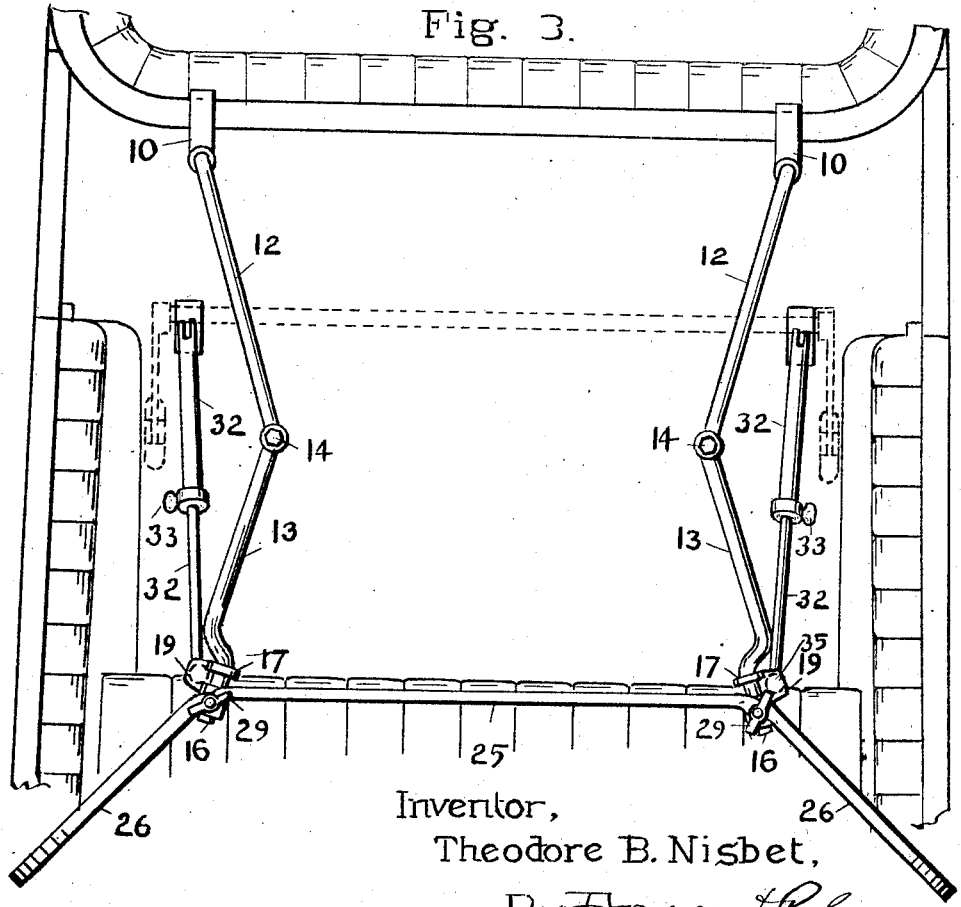

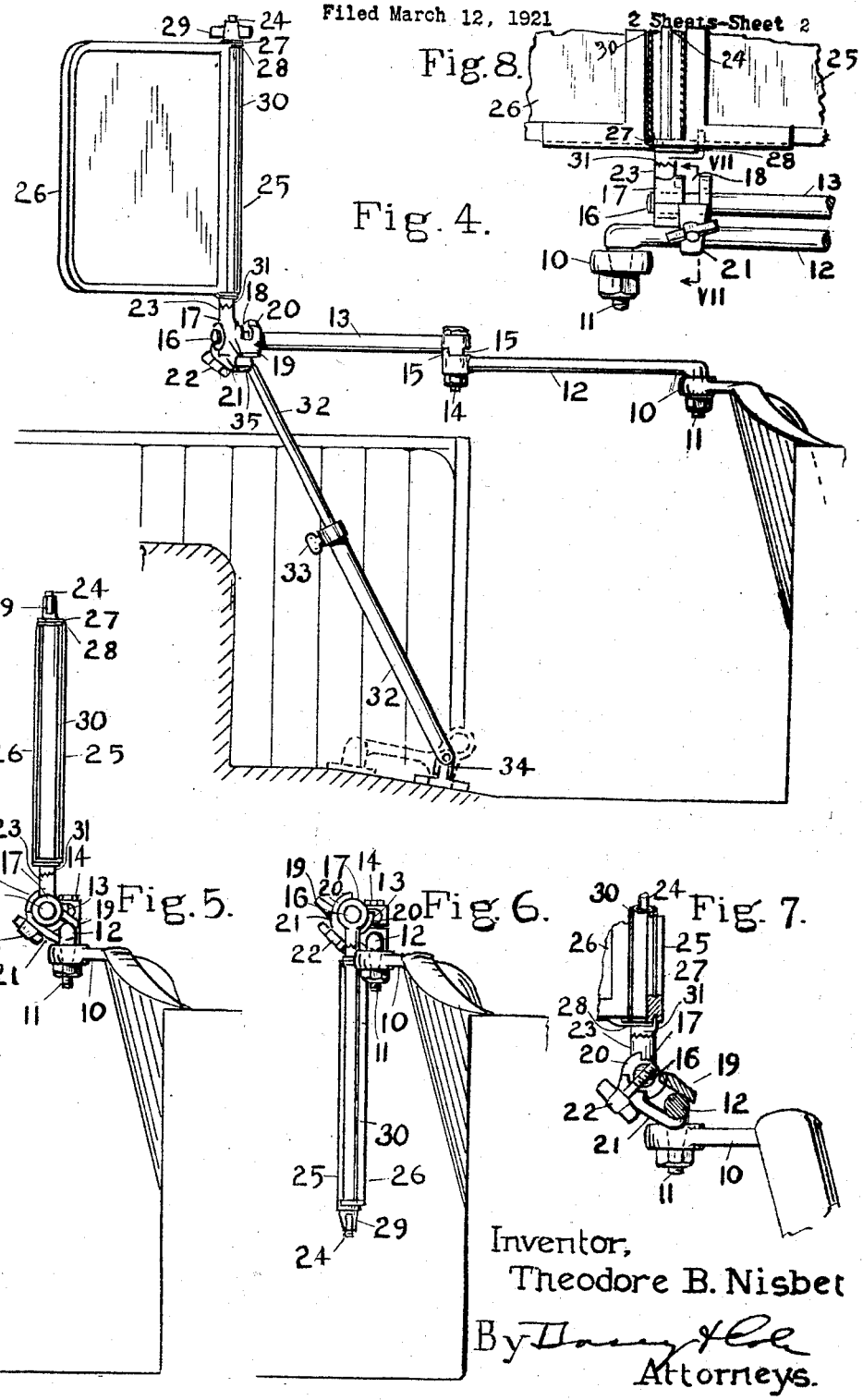

1,558,710

UNITED STATES PATENT OFFICE.

THEODORE B. NISBET, OF IRVINGTON, NEW YORK.

WINDSHIELD FOR AUTOMOBILES.

Application filed March 12, 1921. Serial No. 451,686.

*To all whom it may concern:*

Be it known that I, THEODORE B. NISBET, a citizen of the United States of America, and a resident of Irvington, in the county of Westchester, in the State of New York, have invented certain new and useful Improvements in Windshields for Automobiles, of which the following is a specification.

This invention relates to wind-shields for automobiles of the type referred to in the trade as "tonneau shields," the purpose of which is the protection of the occupants of the second or other rear seats of the automobile.

The object of the invention is a windshield such as referred to of the folding arm type, which is of simple construction and capable of ready adjustment into a range of erect positions extending from the rear of the front seat toward the rear seat as far as desired in accordance with the limitation of construction, which can be folded down to pendant position back of the front seat and which can be readily and firmly secured in various positions. The invention further aims at means whereby the wind-shield may be turned from an erect to a pendant position or vice versa upon the supporting arms themselves without additional joints for this purpose such for instance as are disclosed in United States Letters Patent to Auster 998,320, July 18, 1911.

In addition and if desired supplemental supporting means may be provided as an adjunct in preventing vertical vibration of the shield when extended in erect position to the rear of that immediately back of the front seat.

In illustrating the invention I have shown a main wind-shield on each side of which are folding auxiliary wind-shields with means for adjusting the same in any desired relative position, but it is to be understood that the latter are not necessarily a part of this invention. I have also shown the sections of the supporting arms as superimposed. While this is the preferred construction, it likewise is not essential.

In the accompanying two sheets of drawings which form a part of this application:—

Fig. 1 is a plan view showing the windshield folded down in pendant position at the back of the front seat;

Fig. 2 is a plan view showing the windshield raised to its erect position at the back of the front seat;

Fig. 3 is a plan view showing the windshield in its rearmost erect position;

Fig. 4 is a side elevation of the windshield in the position of Fig. 3;

Fig. 5 is a side elevation of the windshield in the position of Fig. 2;

Fig. 6 is a side elevation of the windshield in the position of Fig. 1;

Fig. 7 is a detail of parts, being a vertical section through one of the rotatable sleeves and jaws on line VII—VII of Fig. 8 drawn on a larger scale; and Fig. 8 is a detail of parts, being a vertical section through one of the pivotal connections between the main shield frame and an auxiliary shield frame and the rotatable sleeve.

The wind-shield is primarily supported from the back of the front seat by brackets 10, 10 suitably attached thereto. It is carried on a pair of folding, horizontally extensible arms which are pivotally mounted on these brackets by pivots 11, 11. The arms each embody two sections mutually associated for relative movement, a lower section 12 and an upper section 13, the adjoining ends of which are expanded and hinge-connected by a vertical pin 14. The adjoining faces of the arm-sections lie in horizontal planes and are formed with stops 15, 15 which limit the movement of the arms to the completely folded and unfolded positions illustrated in Figs. 1 and 3 respectively.

The outer ends of the arms may be bent back (considering the position of Figs. 1 and 2) and constitute aligned bearings 16, 16 for rotatable sleeves 17, 17 upon which the wind-shield is directly mounted. Each sleeve is provided with a circumferentially disposed slot 18 and a fixed jaw 19 projecting forwardly therefrom. Diametrically disposed lugs 20, 20 are formed on the outside of each sleeve for cooperation with a movable jaw 21. The movable jaw is secured in place by a clamping screw 22 which passes through the slot 18 and screws into the rearwardly extended portion 16 of the upper arm-section. The parts are so arranged that when the shield is in its erect position immediately at the back of the front seat, illustrated in Figs. 2, 5, 7 and 8, the jaws 19 and 21 grip the lower arm-sections 12, 12 and maintain the wind-shield in its erect position by preventing rotation of the sleeves on the arms, the sleeves being positively locked to the movable jaws by the lugs 20, 20. The parts are further so arranged that when the wind-shield is in its pendant position, illustrated in Figs. 1 and 6, the movable jaws 21 hook under the lower arm-sections and prevent unfolding of the arms. The turning down of the wind-shield from the erect to the pendant position necessitates the loosening of the clamping screws 22 so that the movable jaws may ride over the upper lugs 20 and assume a position between the lugs on the opposite side of the sleeve from that illustrated in Fig. 7 to prevent the swinging of the wind-shield backwards and forwards. The clamping screw is then tightened to secure the locking just described.

The mounting of the wind-shield upon the sleeves, where auxiliary wind-shields are present, is accomplished as follows:—Each sleeve has a branch 23 the face of which is serrated and in which is mounted a hinge-pin 24. The frame of the main wind-shield 25 and that of the adjoining auxiliary shield 26 are provided with hinge-ears 27, 27 and 28, 28 respectively, through which the hinge-pins extend being clamped together at the top by a wing-nut 29. A tube 30 surrounds each hinge-pin and fills the space between the main wind-shield frame and the adjoining auxiliary wind-shield frame so as to block the wind from entering therebetween and also so as to furnish a sturdy connection between the pairs of hinge-ears for clamping. Interposed between each sleeve-branch 23 and the lower pair of hinge-ears is a serrated washer 31 the teeth of which engage those of the sleeve-branch and which is connected with the frame of the main wind-shield by an upturned prong.

The clamping effected by the wing-nuts 29 not only holds the auxiliary shields in the desired position in respect to the main shield (by frictional contact between the respective hinge-ears) but also holds the wind-shield at the desired distance in front of the back seat when in an extended position. The latter function is effected by locking the main wind-shield (through the serrated frictional contact between the washers 31, 31 and the sleeve-branches 23, 23) in fixed angular relation with the sleeves and with the upper sections of the supporting arms. Furthermore the clamping effected by the wing-nuts 29 cooperates with the stops 15 to prevent a sidewise movement of the wind-shield in its rearmost extended position, for there can then be no reciprocal variation in the angles formed between the two sections of the supporting arms. It will be seen that this function is present not only when the wind-shield is extended but also when in position immediately back of the front seat and that the clamping by the wing-nuts cooperates with the jaw members of the sleeves in locking the wind-shields in the positions of Figs. 1 or 2.

Movement of the wind-shield rearwardly from its erect position immediately back of the front seat automatically prevents the wind-shield from folding down. This is due to destroying the alignment between the bearings 16, 16 of the sleeves 17, 17, for obviously in order that the sleeves may rotate upon the said bearings the latter must be in substantial alignment. The word "substantial" is here employed in view of United States Reissue Patent No. 14,872 granted to me on June 1, 1920. Flexible hinge-pins may be employed herein with like effect as described in said Letters Patent.

As indicated in the preamble hereof additional braces may, if desired, be employed to relieve the strain on the folding arms and add rigidity to the support of the wind-shield particularly in its rearmost position. These are here illustrated as telescopic braces 32, 32, the sections of each of which being provided with clamping means such as wing-nuts 33, 33. These braces are preferably affixed to the floor of the car by universal joints 34, 34 positioned adjoining the foot rail indicated by dotted lines in Figs. 3 and 4 so that the braces may be folded down out of the way on the floor of the car thereunder. The top of each brace may conveniently be provided with a ball 35 for clamping between the jaws 19 and 21 of the sleeves, the jaws being hollowed out to grip the ball firmly.

The operation of the wind-shield may be illustrated by starting with the locked pendant position illustrated in Fig. 1. To raise the wind-shield to an erect position the clamping screws 22, 22 are loosened so that the movable jaws 21, 21 may swing away from the arm-sections 12, 12. The wind-shield with its sleeves is then rotated on the bearings 16, 16 from its pendant to its erect position, the movable jaws riding over one set of the lugs 20 on the sleeves. If it is desired to employ the wind-shield immediately back of the front seat it is then locked in that position by the clamping screws 22 and jaws 19 and 21 as above described. The wing-nuts 29, 29 are then loosened and the auxiliary shields turned to the desired position and there clamped. To turn the wind-shield from this position to the pendant position obviously the reverse of these operations is effected. If it is desired to employ the wind-shield at a position closer to the occupants of a rear seat the clamping screws 32 are loosened to unlock the jaws 19 and 21; the wing-nuts 29 are also loosened; and the wind-shield is then pulled back to the desired position and there held by tightening the wing-nuts 29, as above described. If the braces 32 are to be employed these are extended to the proper length and their ball ends locked by the jaws 19 and 21. If the braces are not to be employed the clamping screws 22 are tightened to prevent rattling. To move the wind-shield forward to its initial position obviously the reverse of this operation is effected.

The foregoing detailed description has been given for clearness of understanding and no undue limitation should be deduced therefrom, but the appended claims should be construed as broadly as permissible in view of the prior art.

What I claim as new and desire to secure by Letters Patent of the United States is:—

1. The combination of a pair of folding, horizontally extensible arms embodying sections which are mutually associated for relative movement, a sleeve rotatably mounted on each arm, and a transversely disposed wind-shield carried by and connecting the sleeves and movable therewith around the axes of the arms from an erect to a pendant position in respect to said axes when the sleeve bearing portions of the arms are in substantial alignment, and means associated with the sleeves for co-operating with certain sections of the arms when the wind shield is in erect position, and for co-operating with other sections of the arms when the wind shield is in pendent position, to retain the wind shield, respectively, in its erect and pendent positions.

2. The combination of a pair of folding, horizontally extensible arms embodying sections which are mutually associated for relative movement, a transversely disposed wind-shield, sleeves rotatable with respect to the arms, pivots on the sleeves on which the wind-shield is mounted, and means for clamping the wind-shield on the pivots and holding the wind-shield in an extended position including means for positively locking the sleeves with respect to said wind-shield, substantially as described.

3. The combination of a pair of folding horizontally extensible arms embodying sections which are mutually associated for relative movement by means of connecting joints, a transversely disposed wind-shield, stops associated with the connecting joints of the arm sections to limit the forward and rearward positions of the wind-shield, vertical pivot connections between the wind-shield and the arms including sleeves rotatable with respect to the arms and on which the wind-shield is mounted, and means for clamping these connections and for positively locking the sleeves with respect to the wind-shield which co-operate with the said stops to lock the wind-shield in its rearmost extended position and prevent sidewise movement thereof, substantially as described.

4. The combination of a pair of folding, horizontally extensible arms embodying sections which are mutually associated for relative movement, a sleeve rotatably mounted on each arm, a transversely disposed wind-shield, auxiliary wind-shields, vertical pivot connections between the main and auxiliary wind-shields and the sleeves, means for simultaneously clamping these connections, and means interposed between the main shield and the sleeves for locking the sleeves against pivotal movement with respect to the wind-shield when said connections are clamped, substantially as described.

5. The combination of a pair of folding, horizontally extensible arms embodying sections which are mutually associated for relative movement, a sleeve rotatably mounted on each arm, a transversely disposed main wind-shield and auxiliary wind-shields, vertical pivot connections between the main and auxiliary wind-shields and the sleeves, means for simultaneously clamping these connections, and positive locking means between the main shield and the sleeves for relatively locking these parts when such connections are clamped, the wind-shield and sleeves being movable around the axes of the arms, from an erect to a pendent position in respect to certain axes when the bearing portions of the arms are in substantial alignment, substantially as described.

6. The combination of a pair of folding, horizontally extensible arms embodying sections which are mutually associated for relative movement, a sleeve with a circumferentially disposed slot suitably mounted on each arm, a clamping screw passing through each slot for securing the sleeve to the arm, and a transversely disposed wind-shield carried by and connecting the sleeves and movable therewith around the axes of the arms from an erect to a pendant position when the sleeve bearing portions of the arms are in substantial alignment, substantially as described.

7. The combination of a pair of folding, horizontally extensible arms embodying sections which are mutually associated for relative movement, a sleeve rotatably mounted on one section of each arm, cooperating jaws associated with each sleeve for locking engagement with the other section of the same arm, and a transversely disposed wind-shield carried by and connecting the sleeve and movable therewith around the axes of the arms from an erect to a pendant position when the sleeve bearing portions of the arms are in substantial alignment, substantially as described.

8. The combination of a pair of folding, horizontally extensible arms embodying sections which are mutually associated for relative movement, a sleeve with a circumferentially disposed slot rotatably mounted on one section of each arm, a clamping screw passing through each slot, cooperating jaws one of which is carried by each sleeve and the other which is carried by the clamping screw for locking engagement with the other section of the same arm, the jaw carried by the clamping screw also serving to secure the sleeve to the arm, and a transversely disposed wind-shield carried by and connecting the sleeves and movable therewith around the axes of the arms from an erect to a pendant position when the sleeve bearing portions of the arms are in substantial alignment, substantially as described.

9. The combination of a pair of folding, horizontally extensible arms embodying sections which are mutually associated for relative movement, braces, cooperating jaws carried by one section of each arm for locking engagement either with the other section of the same arm in the folded position of the arms or with the braces in an extended position of the arms, and a transversely disposed wind-shield carried by and connecting the arm sections which carry jaws, substantially as described.

Signed at New York, N. Y., this 11th day of March, 1921.

THEODORE B. NISBET.